Patented Nov. 17, 1925.

1,561,492

UNITED STATES PATENT OFFICE.

SVEN EMIL SIEURIN, OF HOGANAS, SWEDEN.

MANUFACTURE OF CHAMOTTE BRICKS.

No Drawing.　　Application filed July 27, 1923.　Serial No. 654,257.

*To all whom it may concern:*

Be it known that I, SVEN EMIL SIEURIN, subject of the King of Sweden, residing at Hoganas, Sweden, have invented certain new and useful Improvements in the Manufacture of Chamotte Bricks, of which the following is a specification.

Chamotte bricks are, as well known, the most common of the fire proof bricks; at a high temperature they are, however, very sensitive to load, for which reason they can not be used in such cases where a great load and a high temperature are required simultaneously. In such cases bricks of silica heretofore commonly have been used, but that material, however, from other points of view and especially regarding its capacity of resisting changes in the temperature is very inferior to the chamotte bricks.

It is already known that by an increase of the percentage of silica in fire proof material the so called cone melting point of said material decreases until the said percentage reaches about 90% but that it thereafter rises by a further increase of the percentage of silica. The resisting power of the brick against load at a high temperature, which power could be indicated as the "practical incumbustibleness" of the material, however, is not subject to variation similar to the cone melting point, the minimum resisting power is situated at a percentage of silica between 60% and 70% $SiO_2$. Already at a percentage of about 73% $SiO_2$ the resisting power against pressure at a high temperature is as great as that of a chamotte material with the greatest percentage of clay (corresponding to about 55% $SiO_2$).

Following these observations the applicant has succeeded to produce chamotte bricks with an essentially greater resisting power against load at a high temperature than that hitherto known in the practice.

This is accomplished by adding to the principal mass of the chamotte bricks a binding mass, consisting of a very intimate mixture of finely powdered silica and fire clay in such proportions that the percentage of silica in the mixture in a sample after heating to glowing heat amounts to 73%–90%, preferably, however, between 80% and 90%, and thereafter to form and burn the combined masses in the usual manner.

It is of course also possible to produce the binding mass from a clay in its natural condition containing the quantity of silica required; hereby it is, however, important to grind the clay very well, so that the silica becomes very completely distributed therein.

Having now particularly described the nature of my invention and the manner of its operation, what I claim is:

1. In a process for the manufacture of chamotte bricks, adding to the main mass of the bricks, a binding mass consisting of an intimate mixture of finely divided silica and fire clay, the said mixture being such that a sample of it after heating to glowing heat contains 73–90% silica, and then burning the masses.

2. Chamotte bricks, comprising a main mass of chamotte and a binding mass consisting of an intimate mixture of finely divided silica and fire clay, a red hot sample of which mass contains 73–90% silica.

In testimony whereof I affix my signature.

SVEN EMIL SIEURIN.